(12) United States Patent
Andersson

(10) Patent No.: US 8,469,431 B2
(45) Date of Patent: Jun. 25, 2013

(54) RECONFIGURABLE SEATING ARRANGEMENT

(75) Inventor: Håkan Andersson, Lidköping (SE)

(73) Assignee: Cha Be Di AB, Lidkoping (SE)

( * ) Notice: Subject to any disclaimer, the term of this patent is extended or adjusted under 35 U.S.C. 154(b) by 0 days.

(21) Appl. No.: 12/993,624

(22) PCT Filed: Apr. 29, 2009

(86) PCT No.: PCT/SE2009/050460
§ 371 (c)(1),
(2), (4) Date: Nov. 19, 2010

(87) PCT Pub. No.: WO2009/142576
PCT Pub. Date: Nov. 26, 2009

(65) Prior Publication Data
US 2011/0062751 A1    Mar. 17, 2011

(30) Foreign Application Priority Data

May 22, 2008   (SE) ........................ 0801186

(51) Int. Cl.
*B60N 2/02*   (2006.01)
(52) U.S. Cl.
USPC ...................................... 296/65.04
(58) Field of Classification Search
USPC ........... 296/65.04; 410/2, 3, 4, 7, 23; 297/129
See application file for complete search history.

(56) References Cited

U.S. PATENT DOCUMENTS

| 4,221,396 A * | 9/1980 | Kehl ................................. 280/1 |
| 4,266,822 A * | 5/1981 | Barecki et al. .................. 296/64 |
| 5,456,518 A * | 10/1995 | Kemppainen et al. ........ 297/240 |
| 7,195,302 B2 * | 3/2007 | Jovicevic .................... 296/65.01 |
| 7,455,490 B1 * | 11/2008 | Goosen ............................. 410/7 |
| 2007/0040406 A1 * | 2/2007 | Jovicevic .................... 296/65.01 |
| 2011/0187169 A1 * | 8/2011 | Stewart et al. ................ 297/332 |

FOREIGN PATENT DOCUMENTS

EP   1878609 A2 *  1/2008
GB   2197628 A  *  5/1988

OTHER PUBLICATIONS

Swedish Patent Office, Int'l Search Report in PCT/SE2009/050460, Aug. 21, 2009.

* cited by examiner

*Primary Examiner* — H Gutman
(74) *Attorney, Agent, or Firm* — Potomac Patent Group PLLC

(57) ABSTRACT

The present invention relates to a reconfigurable seating arrangement (10) for car, bus, trains, or the like, comprising first (1) and second (2) frame section elements connected with a backrest part (IA) and a seat part (2A), respectively. A connection and reconfiguration device (3) connects said first frame section element (1) with said second frame section element (2) so that the seating arrangement (10) can be reconfigured between a first functional state wherein the seat part (2A) and the backrest part (IA) form a seat having a backrest, and a second functional state wherein the lower part of the seat part (2A2) forms vertical support to wheelchair (20) or the like.

11 Claims, 13 Drawing Sheets

RECONFIGURABLE SEATING ARRANGEMENT

TECHNICAL FIELD

The present invention relates to a reconfigurable seating arrangement intended to be arranged in a conveyance, e.g., a car, a bus, a rail-mounted car such as a train, commuter train, tram or the like, or a boat, ferry or aeroplane. It comprises a first frame section element and a second frame section element, a backrest part having an upper and a lower end, a seat part having an upper and a lower side. Said backrest part is connected with (or is included in) said first frame section element and said seat part is connected with (or is included in) said second frame section element. A connection and reconfiguration device is arranged to connect said first and second frame section elements in such a way that the seating arrangement can be reconfigured between a first functional state and a second functional state. In said first functional state, the first and second frame section elements are arranged in such a way in relation to each other that the upper side of the seat part and the backrest part form a seat having a backrest, while in the second functional state, the first and second frame section elements are arranged in such a way in relation to each other that, e.g., a wheelchair, a perambulator can be anchored adjacent to said seating arrangement, and that the lower part of the seat part forms an essentially vertical support to the same. Particularly in the case of a wheelchair, the lower part of the seat part forms a rear support to the same, or rather to a person who is sitting in it.

PRIOR ART

Travelling with wheelchair in, e.g., a bus, can be problematic for many different reasons. In the first place, it is required that the wheelchair can be interlocked in a satisfying way in the bus, which may be difficult. In addition, it should be equally safe to travel, e.g., in a bus, for a person who is sitting in a wheelchair as if the person is sitting in a usual seating. Furthermore, it may be space-requiring if, e.g., there should be room for several wheelchairs in, e.g., the bus. It is in various ways known to form devices for the securing of wheelchairs using bands that are anchored in the floor of the vehicle with one of the ends and in the other end can be coupled together with the wheelchair. Such devices are often difficult to handle upon attachment and loosening, and the wheelchair has to be placed in the position, parking position, in which it should be positioned during propulsion of the vehicle already before the securing device can be connected.

SE 420 298 shows a device that should allow easy access for attachment and loosening and that furthermore should guarantee efficient securing. The device comprises a number of pulling elements that are fixedly fitted in the vehicle and a support surface that should form a support to the wheelchair. The pulling elements are fixedly anchored in or adjacent to said supporting device and are in the other end thereof provided with coupling devices that can be coupled together with the wheelchair. By means of said pulling elements, the coupling device can be pulled in toward the supporting device to allow the wheelchair to be secured abutting against the support surface mentioned above.

Device "Easilok 3", Unwin Safety Systems QB15/1548 (03/06) discloses a system having a seating arrangement that in a first functional state can be used as a conventional seating and in a second functional state can be reconfigured so that a wheelchair can be placed and fastened thereto.

For reconfiguration from usual seating into a functional state in which the seating arrangement should work as a wheelchair retention device, the seat of the seating has to be tipped up, i.e., the seat consists of or is hinged in the front edge thereof, and in normal seating position, the upper part thereof is lying turned down on the lower one. For the reconfiguration, the upper part is tipped up 90°, whereupon the entire seating is tipped upward so that the two parts now become aligned with each other. Side flaps on both sides of the tipped-up part are tipped up. Next, the entire unfolded seat, with side edges, has to be tipped up toward the backrest of the seating to become essentially parallel to the same. On the lower part of the stand, snap-hooks, e.g., are arranged by means of which the wheelchair can be fastened. In the second functional state, a wheelchair can be placed with the rear side thereto, at the bottom, the lower side of the inner seating part, and at the top, the upper side of the tipped-up seating part.

However, reconfiguration of the seating arrangement is complicated and requires several hand grips. Therefore, it is almost impossible for a person in a wheelchair by himself/herself to reconfigure the seating arrangement into the second functional state. In order to attach the wheelchair to the seating arrangement, the wheelchair has also in this case to be placed in parking position for the interconnection. Thus, it is disadvantageous with "Easilok 3" in that it is complicated to reconfigure and a wheelchair-bound person can hardly manage to reconfigure the seating arrangement by himself/herself so that the wheelchair can be fixed to the same. Also the fixation is complicated as has been mentioned above. In addition, the arrangement of a wheelchair adjacent to the seating arrangement will be fairly space-requiring. Neither is it easy for a wheelchair-bound person to disengage the wheelchair from the seating arrangement. The seating arrangement is difficult to handle even if an assistant would be at hand and in addition, reconfiguration is time-consuming, which is disadvantageous, e.g., in public transportation services when it is desirable that timetables can be followed, etc.

SUMMARY OF THE INVENTION

It is therefore an object of the present invention to provide a reconfigurable seating arrangement as has been indicated by way of introduction, which is easy to reconfigure between the two different functional states and wherein reconfiguration can be carried out by a single person, particularly by a wheelchair-bound person. It is also an object of the invention that the reconfiguration from the first functional state, wherein it works as a usual seating, into the second functional state, wherein it works as support to and securing device for a wheelchair and vice versa easily should be performable by a wheelchair-bound person. It is a particular object of the invention that the reconfiguration should be performable by a single hand grip. Furthermore, it is an object of the invention that a person in a wheelchair, by the reconfigurable seating arrangement, also should be able to travel safely as well as comfortably in any conveyance according to the above. A particular object of the invention is to provide a reconfigurable seating arrangement that is flexible, easy to handle and not bulky in said first functional state as well as in said second functional state. In principle, it should be equally safe to travel irrespective of whether a tall or a short person is sitting in the wheelchair, a child or an adult.

It is also an object to provide a reconfigurable seating arrangement as has been indicated by way of introduction wherein said connection and reconfiguration device comprises a number of connection members. One end of the respective connection members is, via a first hinge connection, joints or the like, connected with the first frame section element, even more particularly the lower part or the end thereof. The other end of said respective connection members is, via a respective second hinge connection, connected with the second frame section element, suitably on a rear part of the same when the device is in said first functional state, i.e., the part that then is facing the backrest part. Said connection members comprise a spring device for facilitating reconfiguration at least from said first into said second functional state. In addition, the connection members comprise control and lifting members for the control and lifting/lowering of said second frame section element upon reconfiguration from said first into said second functional state, and vice versa. By activation of the spring device, the second frame section element is brought, via the connection members, to be turned around said first and said second hinge connections. The control members are formed to, upon reconfiguration, control the second frame section element so that it also is moved in essentially the vertical direction, and that, in said second functional state, the upper side of the seat part is essentially parallel to the backrest part, and the seat part is in addition displaced upward in relation to the lower vertical position thereof in said first functional state by a distance that is determined by said control members. The reconfiguration from said first into said second functional state can be carried out by means of one hand grip. The reconfiguration is facilitated by activation of the spring device, which can take place by gripping the seat part using a certain small force so that, e.g., disengagement of a blocking or a catch takes place. The spring device can also be provided with a certain resistance so that the overcoming of the same results in the spring device instead facilitating the reconfiguration motion, lifting and rotation/turning, respectively.

According to a preferred embodiment, the lower part of the seat element is provided with a headrest device, which advantageously may be adjustably arranged so that it can be adjusted at least in the vertical direction in said second functional state, so that it can be adapted to different height depending on, e.g., if an adult or a child, a short or a tall person is sitting in the wheelchair. Preferably, the headrest can be adjusted also laterally and/or in depth so that it can be adjusted to be withdrawn or project. Preferably, it can also be adjusted in respect of the inclination thereof so that an upper part of the headrest projects more than a lower part or vice versa in different desired ways. In principle, there are no limitations for how the headrest can be adjusted.

Preferably, the reconfigurable seating arrangement comprises a first catch member that is intended to arrest the seating arrangement in the second functional state, i.e., the position of the second frame section element in relation to the first frame section element or vice versa. This catch member may be formed in a number of different ways, e.g., be associated with the spring device or arranged separately from the same, or connected with or separately from any connection member.

In an extraordinarily advantageous embodiment example, the spring device consists of a gas-damping device, particularly a gas spring having a piston rod running in a cylinder device (piston cylinder). Upon activation of the gas-damping device, the piston rod is arranged to be pushed out of the piston cylinder, so that the piston rod in the first functional state is retracted, while it in the second functional state is projected. The gas-damping device or the gas spring may be of different types, damped or undamped, blockable or not, for instance as some one of those gas springs that are known by the trade name "Varilock". The spring device may also be some form of tension or compression spring device, the essential being that when overcoming a very light resistance, the spring device contributes to facilitate the reconfiguration at least from said first into said second functional state, i.e., that easily overcomeable arrest or blocking can be effected in said first functional state, and that controlled motion then is facilitated.

Different advantageous embodiments of catch members, etc. are defined by the accompanying dependent claims. The reconfigurable seating arrangement is preferably also provided with a connection and fastening device that is easy to access and easy to handle, which can be handled by a wheelchair-bound person and which in addition allows that a wheelchair can be pulled towards the seating arrangement in the second functional state thereof (without it needing to be in parking position for fastening). It should also be possible to fasten the wheelchair in a safe and easily releasable way. Embodiment examples of the connection and fastening device as well as other embodiment examples are described in the detailed description of the invention and are defined by the appended claims. However, the seating arrangement described in this application can be used with essentially any suitable connection and fastening mechanism.

Additional preferred embodiment examples are defined by the appended claims.

BRIEF DESCRIPTION OF THE DRAWINGS

In the following, the invention will be further described, in a non-limiting way, reference being made to the accompanying figures, in which.

DETAILED DESCRIPTION

Figure 1:
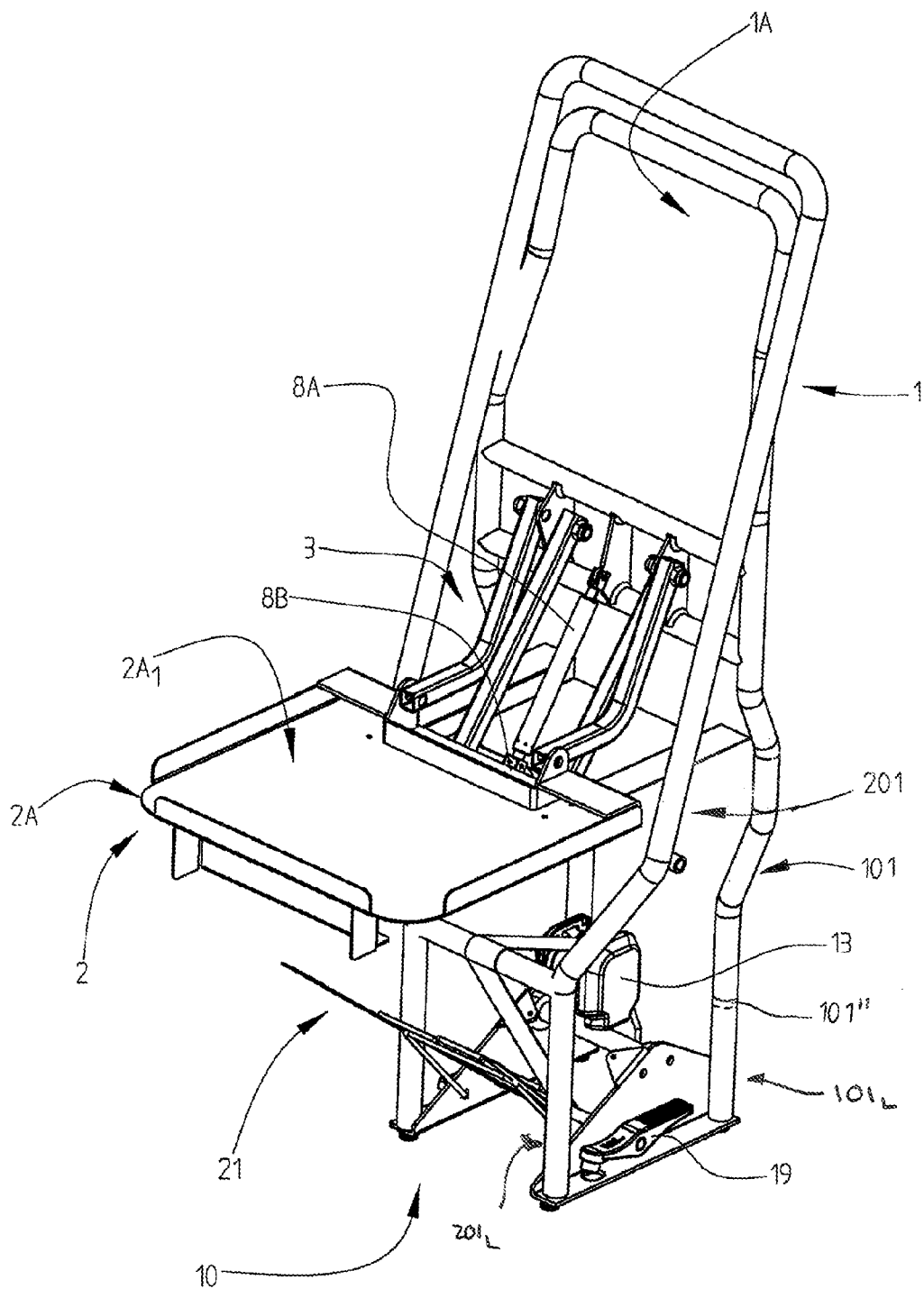
FIG. 1 shows an embodiment of a seating arrangement according to the present invention in the first functional state thereof as a seat having a backrest.

FIG. 1 shows an embodiment example of a seating arrangement 10 according to the invention. The seating arrangement 10 comprises a first frame section element 1 and a second frame section element 2. The first frame section element may be formed in many different ways and is of course not limited to the construction shown in FIG. 1. The first frame section element 1 supports a backrest part 1A. In principle, the first frame section element may alternatively consist of a backrest part or also comprise a backrest part that forms a support to a person who is sitting in the seating arrangement. The backrest part 1A is preferably provided with or consists of cushions or the like. What is essential for the definition of the invention is that a frame, e.g., in the form of a first frame section element, comprises or supports a backrest. The seating arrangement also comprises a second frame section element 2 that supports or comprises a seat part 2A having an upper side $2A_1$ and a lower side $2A_2$, respectively. The upper side $2A_1$ is intended to serve as seat for a person in a first functional state of the seating arrangement 10. Also here, there are not shown possible cushions, etc., which may be formed for the sake of the comfort and the seat part may either be considered to consist of such cushions or some form of frame that supports a seat cushion or the like. The lower part of the first frame section element 1 or the backrest part 1A and the rear end of the second frame section element 2 or the seat part 2A are interconnected by a connection and reconfiguration device 3 (see particularly FIG. 6). In the embodiment example shown, the seating arrangement 10 is mounted or mountable on a substratum directly or via a frame that also may be included in the first frame section element. In an alternative embodiment example, the second frame section element may be intended to be mounted on a substratum or also both frame section elements may consist of a common frame section element having two parts (seat part and backrest part), etc., reconfigurable in relation to each other. In FIG. 1, a floor attachment 19 is shown, which serves for mounting of the seating arrangement 10 in the floor. This may be provided in any way, the seating arrangement may be fixedly mounted in the floor, or detachably, rotatably arranged, etc.

Figure 2:
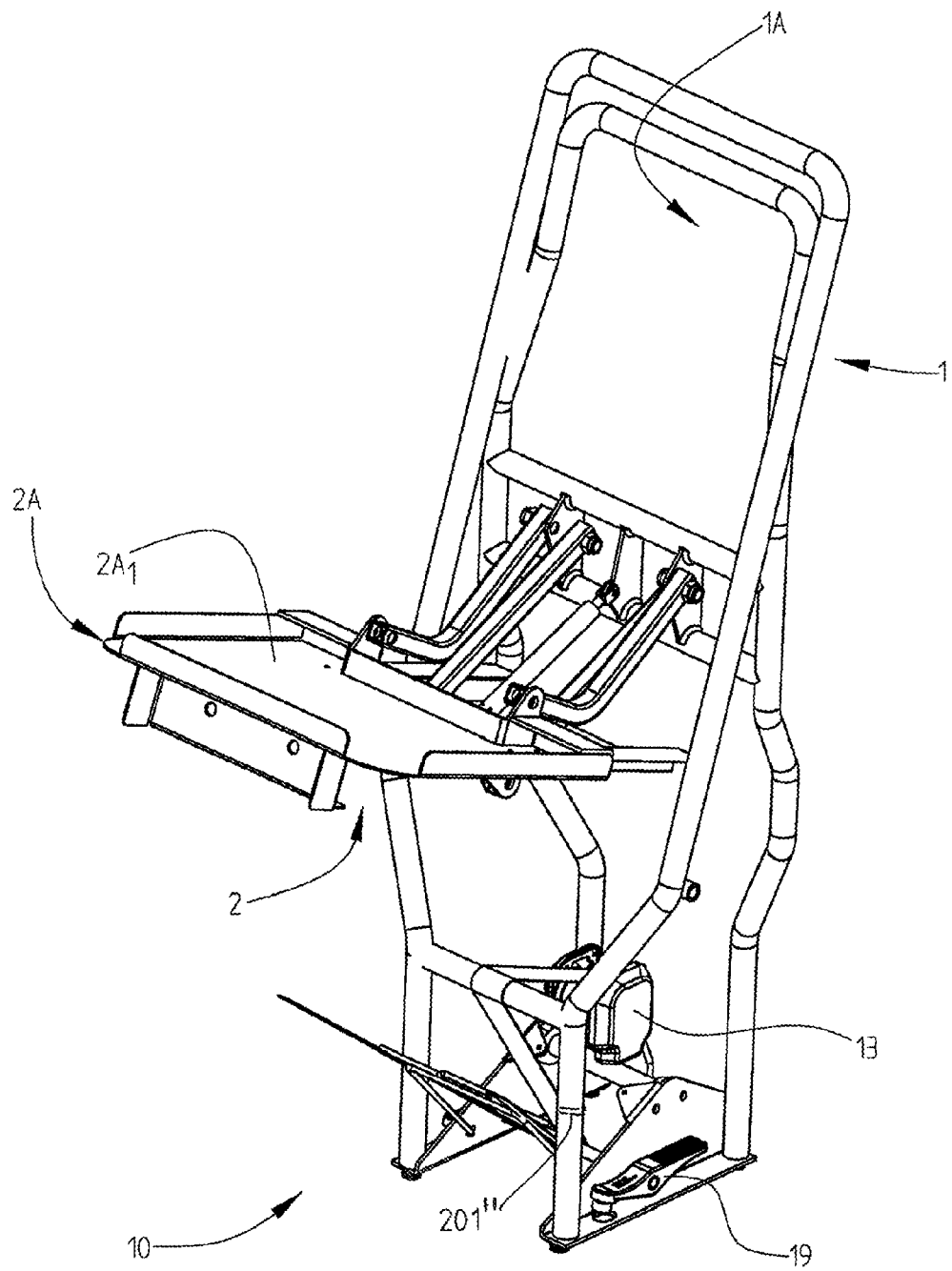
FIG. 2 shows the seating arrangement according to FIG. 1 in a state during reconfiguration in progress from said first into said second functional state (or vice versa)
Figure 3:
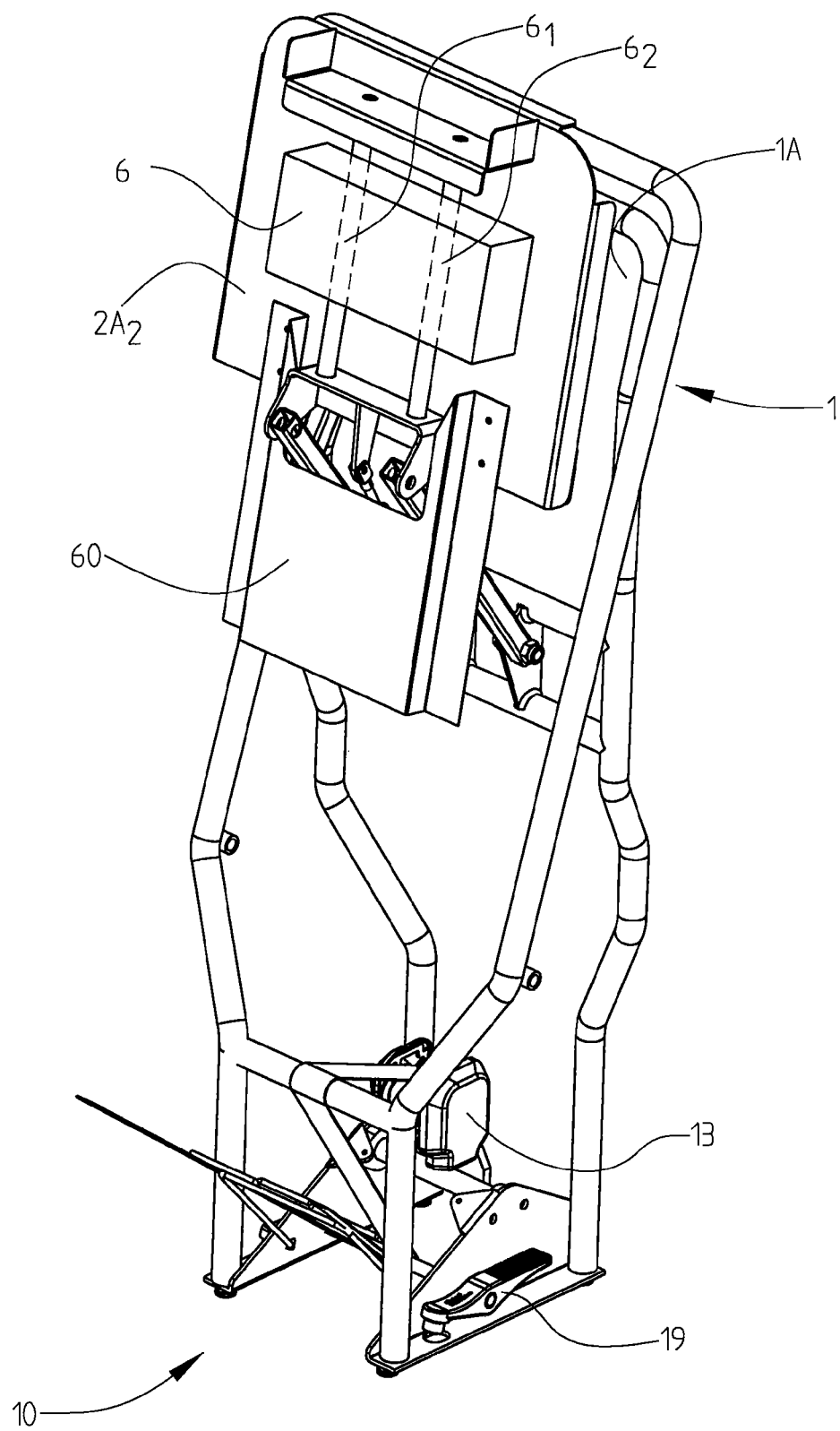
FIG. 3 shows the seating arrangement according to FIG. 1 in the second functional state thereof, wherein it forms a rear support to a wheelchair or the like, FIG. 4 is a side view of the seating arrangement according to FIG. 1, i.e., in the first functional state thereof.
Figure 6:
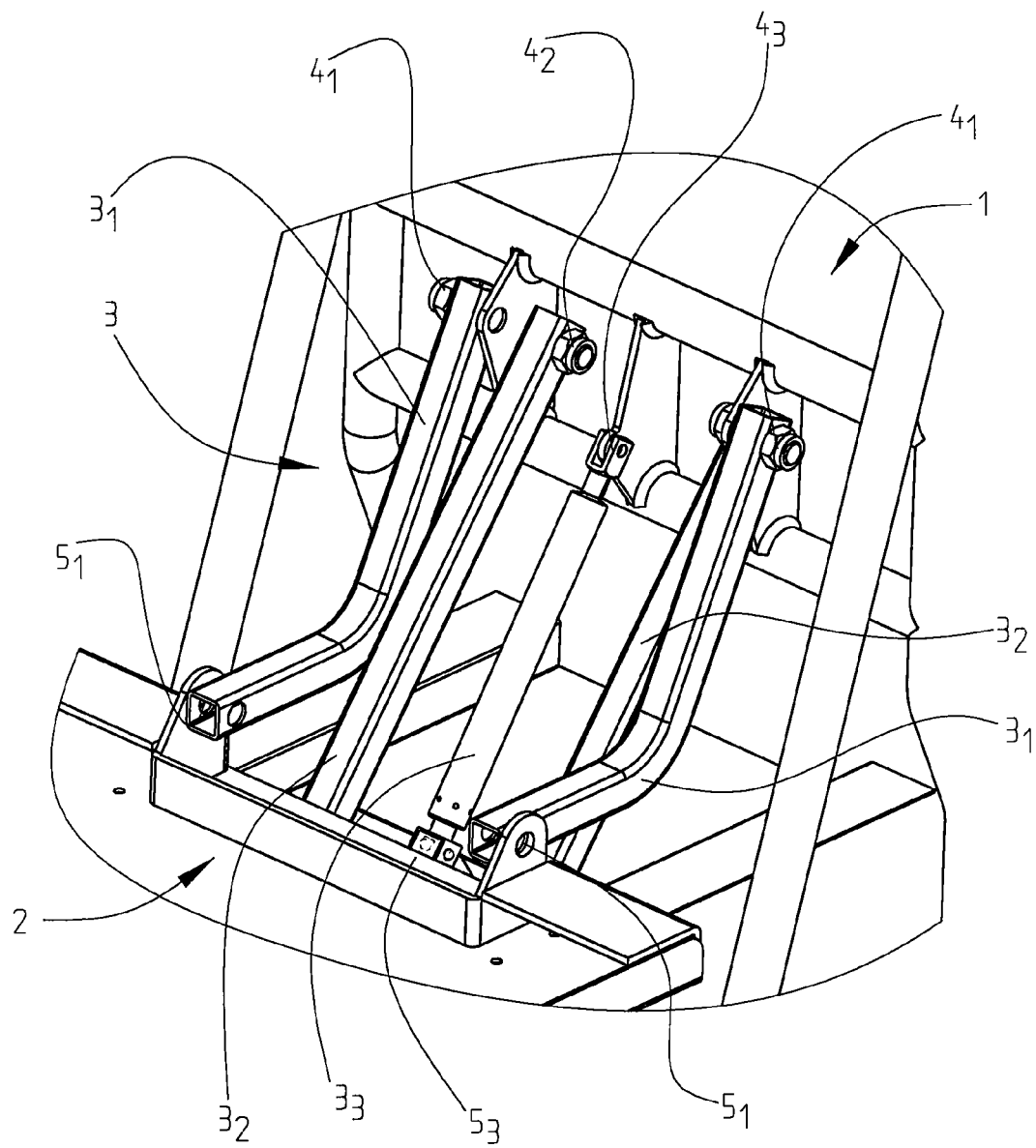
FIG. 6 is an enlarged view of the connection and reconfiguration device shown in FIG. 1, FIG. 7 schematically shows a wheelchair secured to the seating arrangement in the second functional state thereof.

FIG. 2 shows the seating arrangement 10 during reconfiguration in progress from said first functional state into a second functional state shown in FIG. 3, or vice versa. The reconfiguration procedure may, for instance, be initiated by the fact that a user, e.g., a wheelchaired person, grips the front edge of the seat part 2 while overcoming a weak force, e.g., a weak spring loading or a catch, e.g., a blocking valve in a gas spring, etc. According to the invention, when said light resistance has been overcome and the transition from the first to the second functional state has commenced, the reconfiguration motion of connection members included in the connection and reconfiguration device 3 is facilitated, see FIG. 6 below. With reference to FIG. 6, which shows the connection and reconfiguration device, connection is provided of the first frame section element with the second frame section element (or the backrest part with the seat part) by a number of connection members. In the example shown, the connection and reconfiguration device 3 comprises two link-arm connection members $3_1, 3_1$, here arranged on both sides of a spring device $3_2$ as well as control members $3_3$. The connection members $3_1, 3_1, 3_2, 3_3$ are, by hinged connections $4_1, 4_1, 4_2, 4_3$, connected with the upper frame section element and by lower hinged connections connected with the second frame section element $5_1, 5_1, 5_2, 5_3$. The hinged connections may be formed in various ways and consist of different types of hinged, mounted or coupled joints.

The spring device $3_3$ consists of a particularly advantageous embodiment of a gas-damping device, having a gas spring including a piston rod 8B running in a cylinder device, piston cylinder, 8A. In said first functional state, the piston rod 8B is inserted into the piston cylinder 8A. Second catch members (not shown) may be arranged separately or be included in the gas-damping device $3_3$ as a valve or the like to slightly block the device in the first functional state. For instance, the gas spring may automatically block at fully inserted position or at a desired inserted position, e.g., by the fact that a valve is kept closed and where the opening of the same results in the piston rod 8B being pushed out of the piston cylinder 8A by a certain speed. Different types of gas springs may be used, they may be blockable or not. Preferably, a gas spring used in a seating arrangement according to the present invention is arrestable in said first functional state, alternatively separate catch or blocking members are arranged. However, said catch or blocking should be very easy to overcome. According to one particular embodiment, the gas-damping device is in addition, or only, blockable in said second functional state, i.e., when the piston rod is projected, by means of first catch members (described below).

The connection and reconfiguration device 3 may comprise one or more spring devices $3_3$, particularly one or more gas springs. The connection and reconfiguration device 3 also comprises a control and lifting member $3_2$, in which also lifting members 31, 31 can be considered to be included. These can also consist of separate members. A special control member $3_2, 3_2$ intends, upon activation of the spring device $3_3$, to determine/control the motion vertically during the reconfiguration in which the connection members by the hinged connections thereof are turned so that the seating part 2A mounted or included in the second frame section element on one hand is turned upward or clockwise (is rotated upon reconfiguration from the first into the second functional state) but also is displaced upward as is determined by control members $3_3$. The seating part of the second frame section element may accordingly be said to be turned or rotate around the respective hinge connections $4_1, 4_1, 4_2, 4_3; 5_1, 5_1, 5_2, 5_3$, are tipped up and also displaced upward. The reconfiguration motion is facilitated by the spring device and the displacement vertically is determined by the lifting members $3_2, 3_2$. One of the reasons for the second frame section element including the seat part to be displaced upward, i.e., the height above the substratum that it assumes in the first functional state is lower than the height at which, in said second functional state, (see FIG. 3) the lower or rear edge of the seat part is. This serves to leave room for, for instance, a wheelchair or perambulator that should be pushed next to a seating arrangement so that the same can serve as backrest and/or in headrest and thereby give room for wheels, etc.

In FIG. 3, the seating arrangement is in the second functional state thereof. The second frame section element 2 (the seat part 2A) is raised and is essentially parallel to the backrest part 1A of the first frame section element 1. According to one embodiment, the seat part is displaced upward and projects above the upper edge of the backrest part or the first frame section element. The second frame section element 2 or the seat part 2A can be displaced upward more or less and can, but does of course not need to, end up above the upper edge of the backrest part, which of course depends on if the backrest as such is high or not, the design of the seat part, etc.

According to a very advantageous embodiment, to which the invention however is not limited, the lower part of the seat element is provided with a headrest device 6, which does not appear in said first functional state but then is hidden either under the seat part or inside the seat part or in the first frame section element. According to one embodiment, a headrest is mounted on or integrated with said second frame section element 2 or seat part 2A. Advantageously, the headrest 6 may be displaceably arranged, e.g., on tubes $6_1$, $6_2$ or the like, so that it can be adjusted at least vertical in the direction when the seating arrangement 10 is in said second functional state. It is of course also possible to have a fixedly arranged headrest. According to other alternative embodiments, the headrest is movably arranged, in addition to vertically, also laterally so that it can be adjusted also in the horizontal direction. It may also be adjustable so that it can project more or less, e.g., be rotated around a horizontal shaft on which it is mounted so that the lower edge thereof projects more than the upper one thereof or vice versa, and/or around a vertical shaft, so that it can be adjusted according to personal needs, the size of a wheelchair-bound person, etc., or simply be recessed in case it is not needed if, e.g., a perambulator or the like instead should be placed at and fastened to the seating arrangement 10. An extra back-supporting element 60 may possibly be arranged that, e.g., may comprise a padding (not shown) or a reception area for the upper part of a wheelchair. The invention is of course not limited to comprise such an element. If it is included in the seating arrangement, it may be formed in any suitable way.

Figure 4:
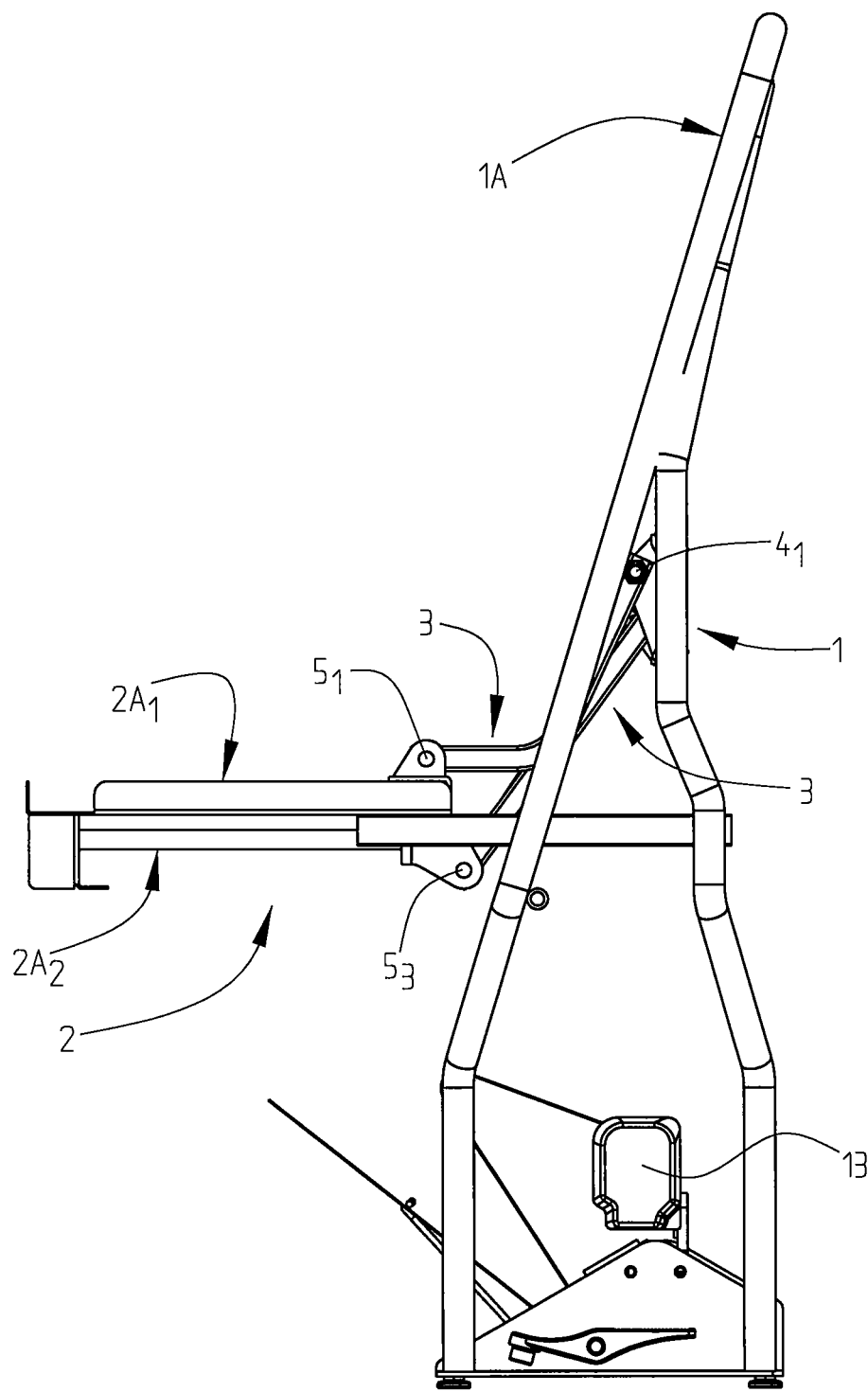
Figure 5:
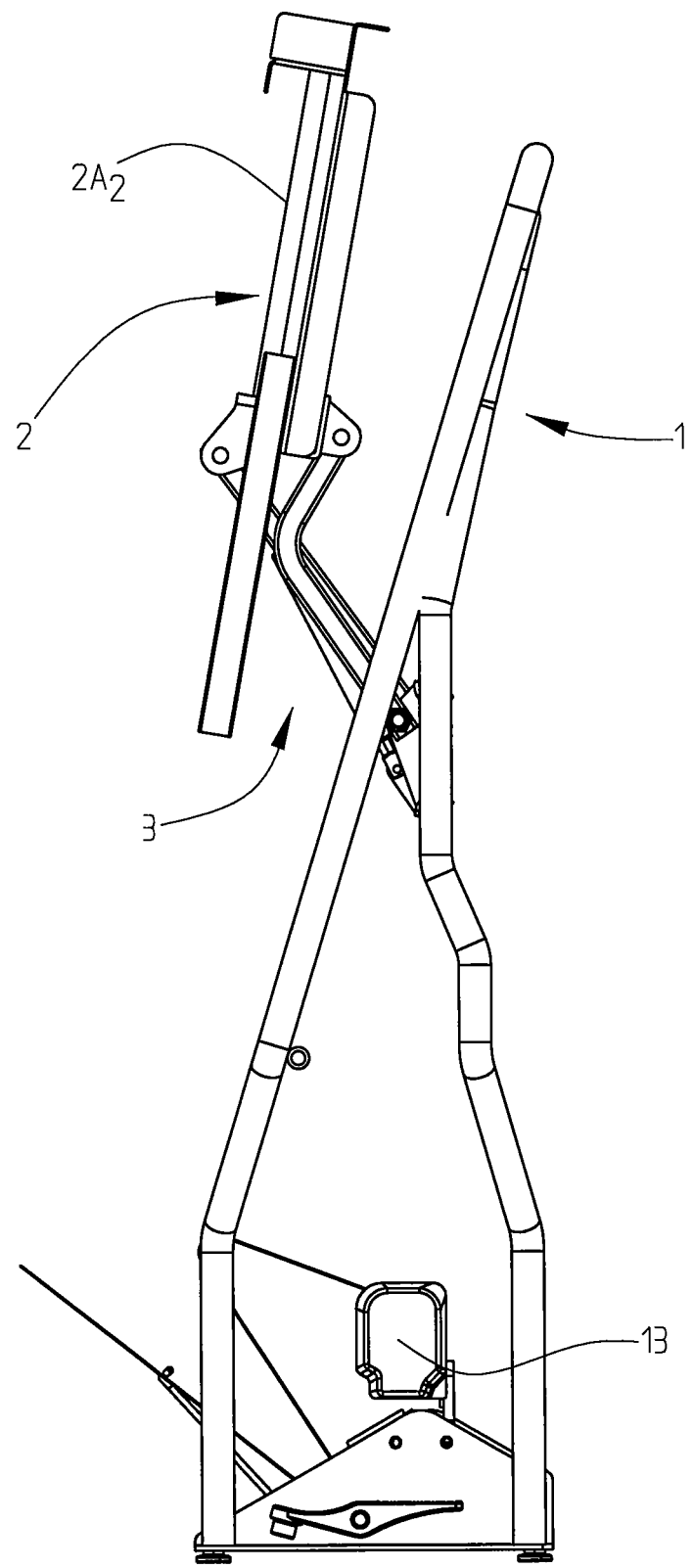
FIG. 5 is a side view of the seating arrangement according to FIG. 3, i.e., in the second functional state thereof.

FIG. 4 is a schematic side view of the device of FIG. 1 while FIG. 5 is a schematic side view of the device in the second functional state (FIG. 3). As has previously been mentioned, the frame section elements 1,2 may be formed in many different ways and the first frame section element does not have to comprise front and rear tubes, etc., but it may be formed of one or more pieces, e.g., only rear legs or as pressed sheet-metal. Likewise, the seat part may be provided with legs etc., or consist of a pressed sheet-metal plate. In FIGS. 1-3 and 4, 5, respectively, an inertia-reel seat belt device 13 is also illustrated. The invention is not limited to such a connection and fastening device, but in principle any suitable connection and fastening device can be utilized.

Figure 7:
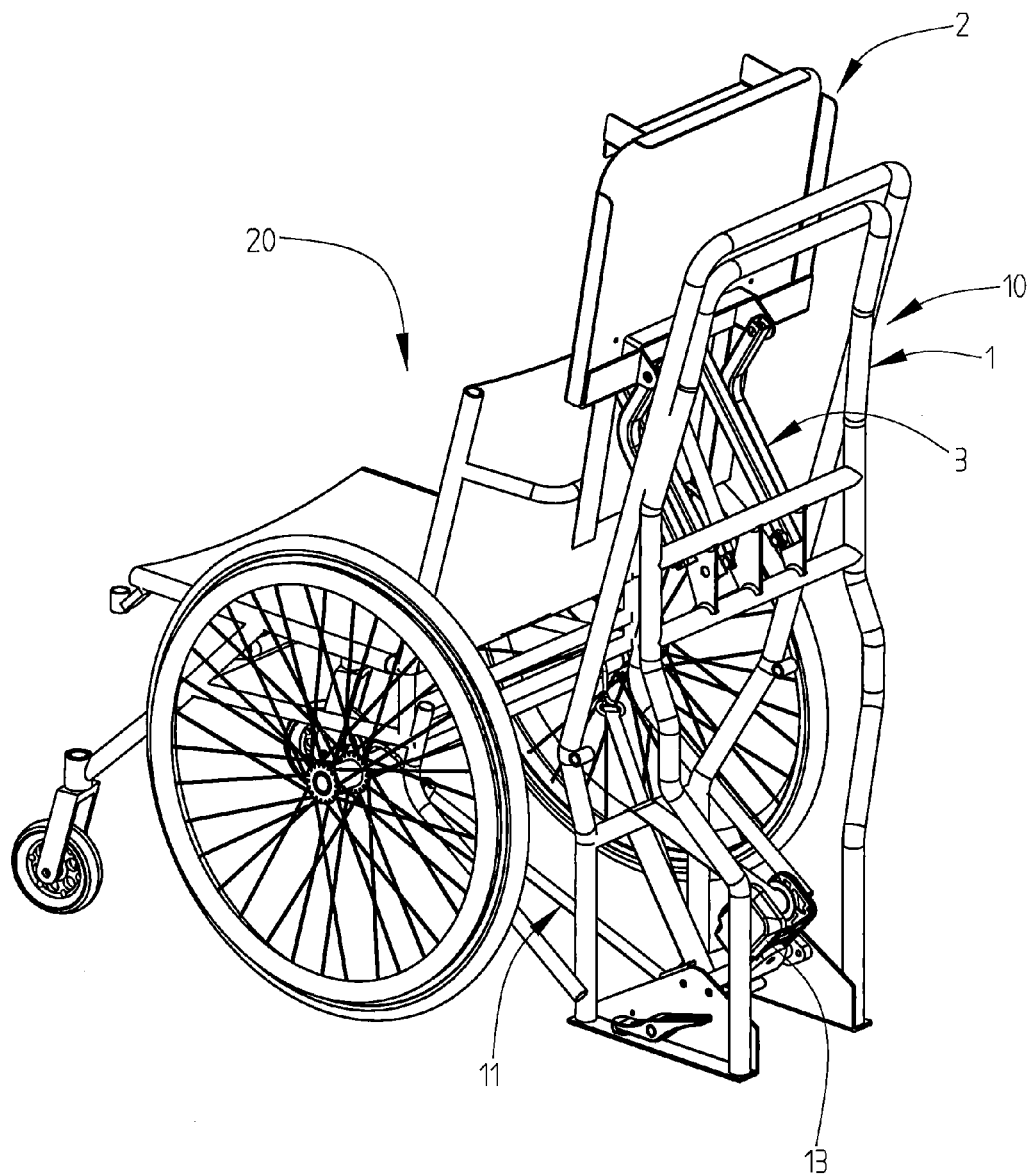

FIG. 7 shows very schematically a seating arrangement 10 in the second functional state thereof and a wheelchair 20 that is fastened to the seating arrangement 10 in such a way that the lower part of the seating arrangement works as backrest and/or headrest for a person (not shown) who is sitting in the wheelchair. The wheelchair 20 is fastened to the seating arrangement 10 by a connection and fastening device 11. An advantageous embodiment of a connection and fastening device 11 is particularly shown in FIGS. 10A, 10B, 11.

Figure 8:
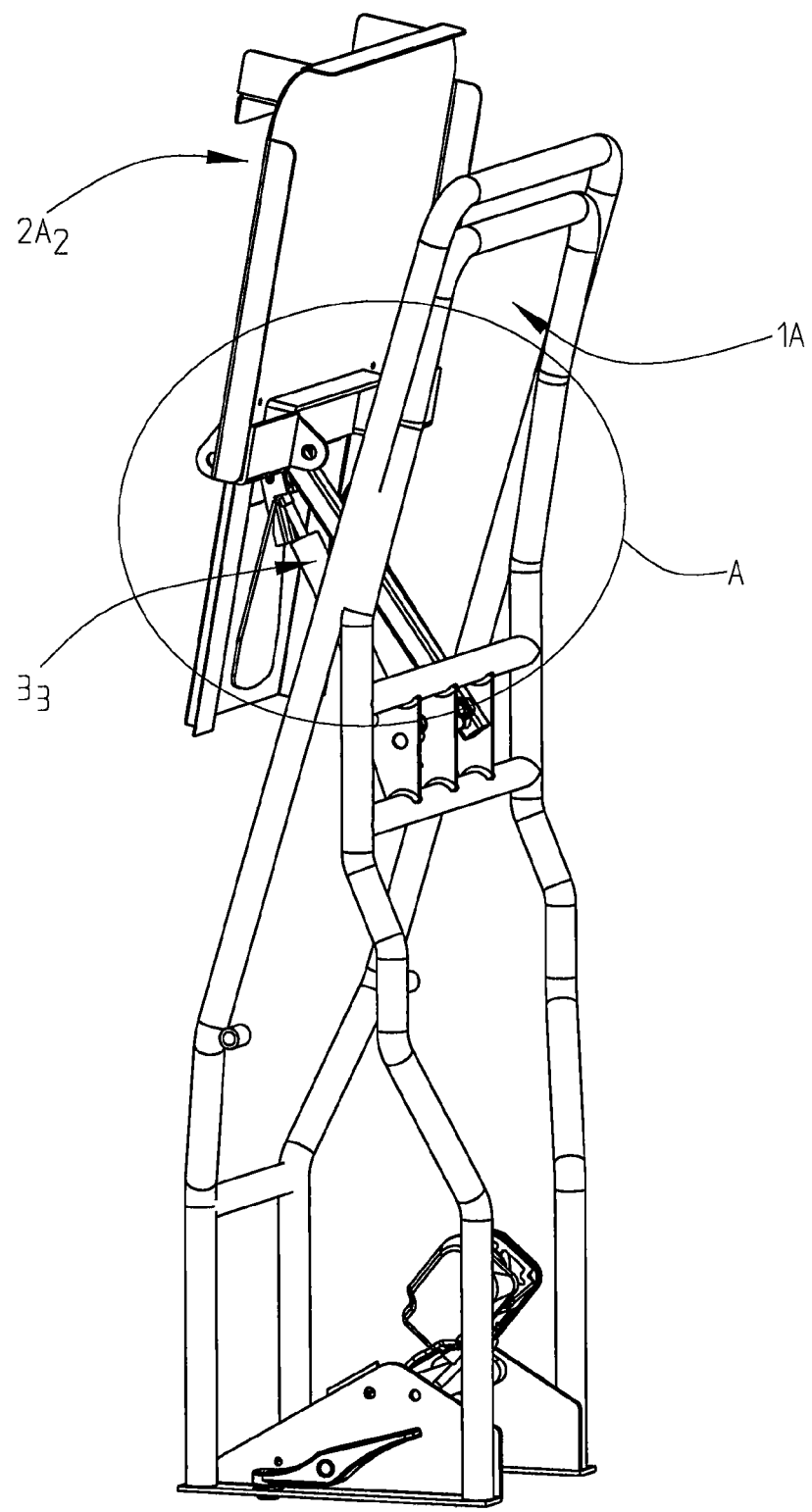
FIG. 8 is a figure similar to FIG. 3 of a preferred embodiment wherein catch members are arranged for arrest in said second functional state.

FIG. 8 is a perspective view of the seating arrangement 10 in the second functional state thereof and as seen from another angle than in FIG. 3 in order to illustrate an example of first catch members 7 to arrest the seating arrangement in the second functional state thereof by arresting or blocking the spring device $3_3$. Here, the spring device $3_3$ consists of a gas spring where a piston rod 8A runs in a piston cylinder 8B. The gas spring consists of a piston cylinder having a length $L_c$ and a cylinder piston 8B having a length of stroke $L_k$ that may be said to define the maximal length that the piston can be pushed out, possibly somewhat reduced depending on a damping device (not shown) as is known. The gas spring may be blockable and consist of a piston cylinder having a combination of a pneumatic and hydraulic device wherein oil chambers are present on both sides of the piston and communicate with each other by a valve through which the oil flows in the open valve position. When the valve is closed, the piston is locked in a blocked position. This can be controlled or manoeuvred in various ways. A chamber filled with gas that is hermetically separated by a floating piston may provide projection of the piston rod 8B. However, this only indicates one particular embodiment.

Figure 9:
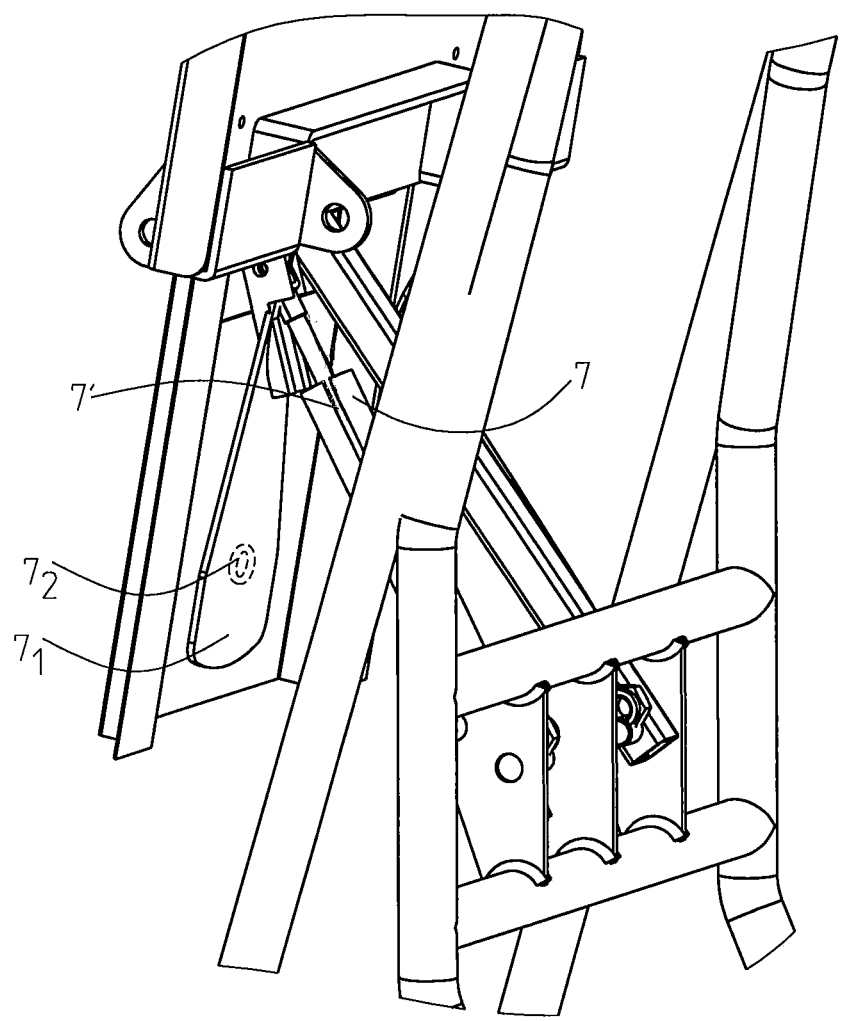
FIG. 9 is an enlarged view of section A of FIG. 8 illustrating one particular embodiment of catch members and catch actuating members.

In FIG. 8, the piston rod is projected and the catch member is here assumed to consist of a tube or a sleeve having a slot 7' that may be milled or the like along the tube (or the sleeve) is so that this is open. Said open tube or sleeve 7 is constantly pressed against the gas spring. The opened tube or sleeve is assumed to have a length that approximately corresponds to the length of stroke and when the entire stroke is out, as in FIG. 8, the opened tube or the sleeve 7 will position itself so that it abuts against the wider part of the gas spring, i.e., the edge of the piston cylinder 8A. The open tube 7 may be articulately connected with and fixed to the thinner part of the gas spring, i.e., the piston or the connection thereof with frame section element 1, and be pressed against the gas spring by a certain force, which makes that the sleeve is pressed against the thicker part of the gas spring, the piston cylinder. Catch actuating members $7_1$ are arranged to be able to disengage catch members 7. This is carried out, e.g., by pressing in the handle and thereby bending out the sleeve so that it runs on the outside of the gas spring. This makes that the piston rod can be pushed into the piston cylinder and the seating arrangement transforms into the first functional state. According to another embodiment comprising catch members 7 and catch actuating members $7_1$ as shown in FIGS. 8, 9, the piston cylinder provided is with a protecting tube or the like (not shown). Thereby, catch members 7 will be pressed against said protecting tube or protection member instead of against the piston cylinder, which thereby is protected. It is evident that catch actuating members may be formed in many different ways, here only one example being shown. It is also possible to use a gas spring device that can block in both ends.

Figure 10A:
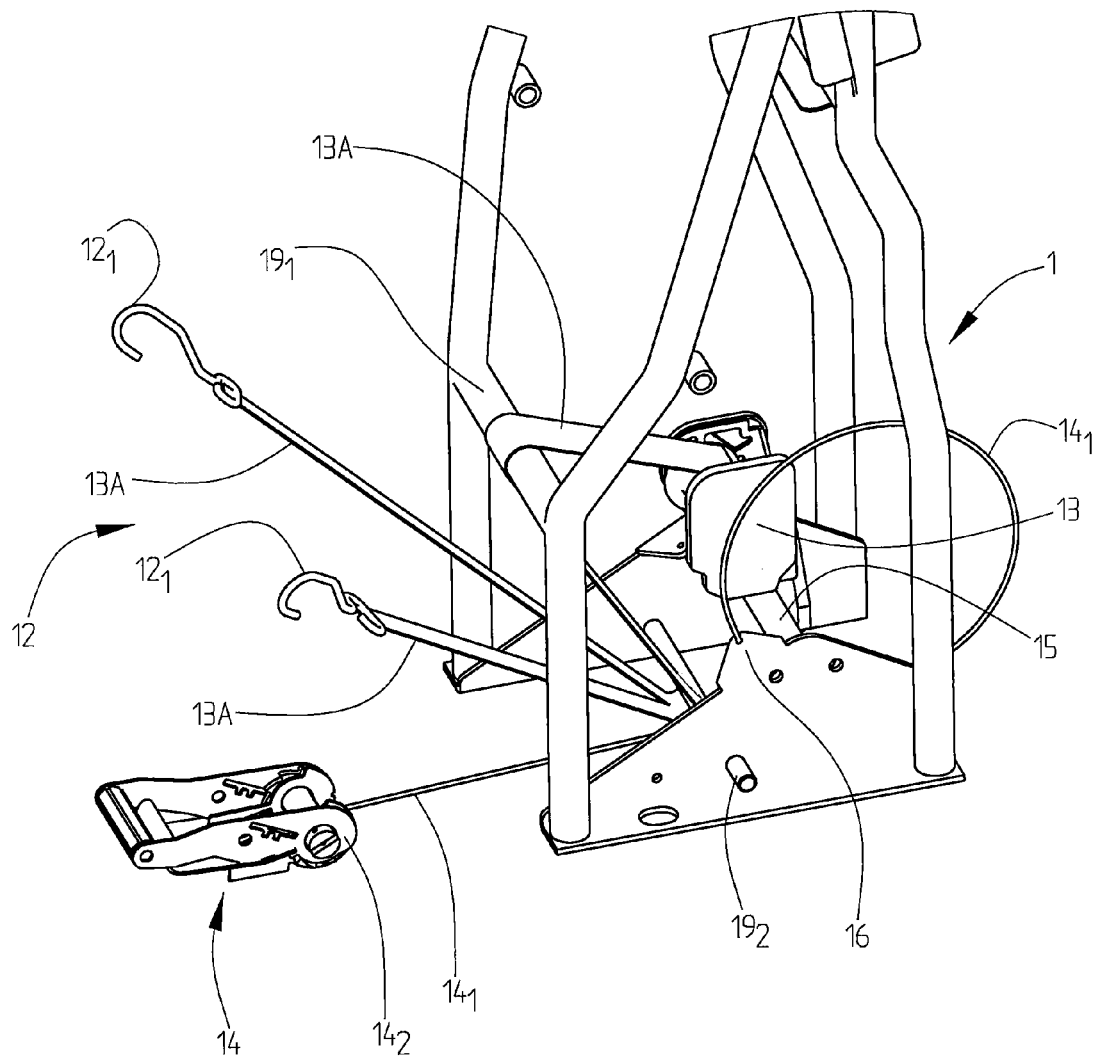
FIG. 10A shows an example of a connection and fastening device.
Figure 10B:
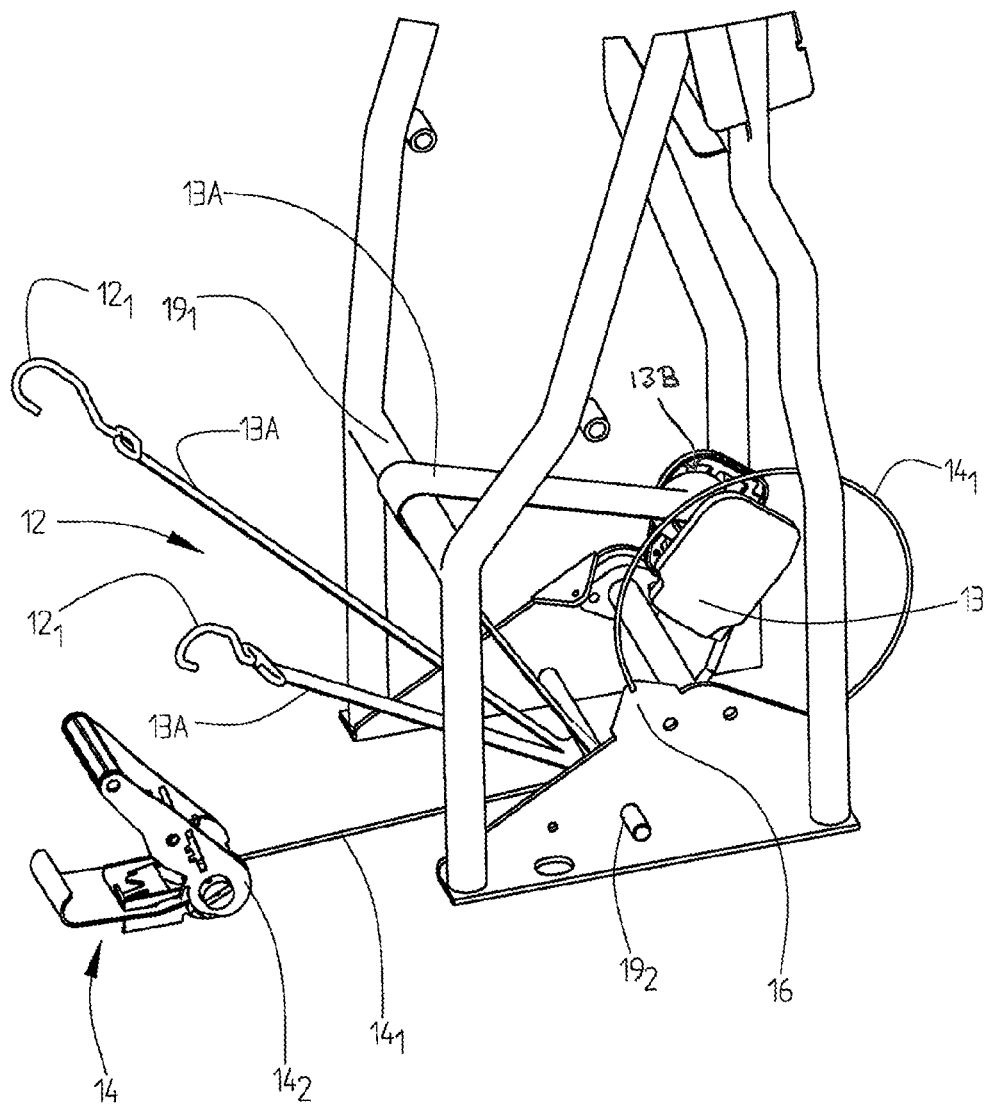
FIG. 10B shows the connection and fastening device of FIG. 10A in a state wherein the wheelchair can be pulled rearward and be fastened.

FIGS. 10A, 10B show an example of a connection and fastening device 11 that is intended to allow fastening of a wheelchair 20 or the like to the seating arrangement 10 in said second functional state. It comprises an attachment mechanism 12, which here comprises two hooks $12_1$, $12_1$ that in said first functional state are placed on the seating arrangement 10 in such a way that they upon reconfiguration into said second functional state become easily accessible, particularly for a person in a wheelchair. For instance, they may be arranged on said first or second frame section element at a suitable height above the surface on which the seating arrangement is mounted and on the side thereof where the wheelchair should be placed. Suitably, the attachment mechanism comprises two hooks but there may also be more or fewer. There may be one or more snap-hooks or the like. There could also be some attachment member, e.g., loops or the like, in which hooks that are mounted on a wheelchair could be hooked into when the same is desired to be fastened to the seating arrangement. According to an advantageous embodiment, the attachment mechanism 12 is connected with or includes a two-piece belt band that is included in a seat belt mechanism having an inertia-reel seat belt 13A. The inertia-reel seat belt 13A may be said to be divided the last distance up to the hooks or the like, so that the same should be possible to be hooked in at a suitable distance from each other. In known way per se, the belt band is reelable in a reeling mechanism 13, which is mounted on a shaft or the like, suitably a horizontal shaft 15, in the lower part of the seating arrangement, which extends from one side of the seating arrangement to the other (also in FIG. 11).

According to an advantageous embodiment, to which however the invention by no means is limited, the hooks $12_1$, $12_1$ are attached via a spring-loaded arm 21 (see FIG. 1) that lifts the hooks a certain height above, e.g., the floor surface of the vehicle, e.g., 15-50 cm. According to an advantageous embodiment example, the belt band 13A or the bands in which the hooks 12$_1$, 12$_1$ are arranged, runs or run via lower and upper return links 19$_1$, 19$_2$ or similar unloading members that, on one hand, serve to decrease the load and allow the fastening force to be increased, and on the other hand to decrease forces that may arise in a collision. The reeling mechanism or housing 13 of the belt is fixedly mounted on shaft 15, e.g., on a sheet-metal plate mounted on the same. A wire 14$_1$, which preferably runs in a wire casing (not shown here), is included in a so-called retaining strap 14. Preferably, the wire 14$_1$ is fixedly connected with the shaft or the centre hub of the shaft 15 in a connection point 17$_1$. In a first state, the hooks 12$_1$, 12$_1$ can be tightened and hooked into the wheelchair. Then the reeling mechanism 13 of the inertia-reel seat belt is situated, for instance, as is shown in FIG. 10A, which illustrates the state when the hooks can be pulled out and be attached in a wheelchair. When the same then have been fitted in a suitable way, the retaining-strap handle 14$_2$ is activated (is pumped), which results in the reel band being blocked, in this particular case by the fact that the reeling mechanism or the casing 13 is tilted rearward, see FIG. 11, since the retaining strap 14$_1$ with wire (and casing, see FIG. 11) is fixed in the hub of the shaft 15 on which the inertia-reel seat belt mechanism 13 is mounted. This is shown in FIG. 10B wherein a (conventional) locking mechanism 13B in the reeling mechanism of the inertia-reel seat belt has locked the belt. Additional pumping with the retaining-strap handle 14$_2$ results in the wheelchair being pulled rearward. Since the wheelchair or the like already was placed in a such position that it could be hooked in the hooks, no greater movements is required but it is in principle only about a number of centimeters, normally some or a few decimeters or less, e.g., up to 15 cm, which is effected by additional pumping or tightening of the retaining strap, which accordingly results in the inertia-reel seat belt (now locked) pulling the wheelchair rearward so that it becomes safely secured to the seating arrangement in a desired way, preferably with backrest as well as headrest. In order to disengage the wheelchair, the catch of the retaining strap is disengaged and it becomes once again possible to roll the chair a distance away from the seating arrangement so that the attachment mechanism 12 can be released. The retaining-strap handle 14$_2$ may be mounted anywhere provided that it is easily accessible, particularly for a wheelchaired person. For instance, it may be mounted on the side of the seating arrangement 10 or on a seating being in front, on the wall at the seating arrangement or on some bar or partition wall, etc., the essential being that it easily can be gripped by a person who has placed the wheelchair or the perambulator in place close by the seating arrangement in the second functional state thereof (but yet not in final parking position). (Not shown in the figure, a conventional safety belt, e.g., three-point seat belt, is suitably arranged on a suitable location in order to allow fastening of the person in the wheelchair.)

In an alternative embodiment, instead of the retaining strap and rotation of the inertia-reel seat belt, a self-locking belt is utilized, preferably an automatic self-locking and self-tightening belt having a hook. To disengage the wheelchair or the like, a rocker, e.g., is mounted to, above, the disengagement lever. From the rockers, a wire or the like extends, preferably in a casing, to a control at sitting height. To bring about disengagement of the wheelchair, the control is actuated in a suitable way. For instance, a suitable so-called automatic belt unit may be utilized.

In different preferred embodiments, the reconfigurable seating arrangement may be provided with a whiplash protection that may consist in that either front or rear legs 201$_L$, 101$_L$ that support or are included in the seating arrangement are provided with weakenings or perforations 101" (see FIG. 1), 201" (see FIG. 2) for absorption of strong impacts. Preferably, a whiplash protection is formed in such a way that it works as protection against whiplash injury during utilization of the seating arrangement in the first as well as in the second functional state thereof.

Figure 11:
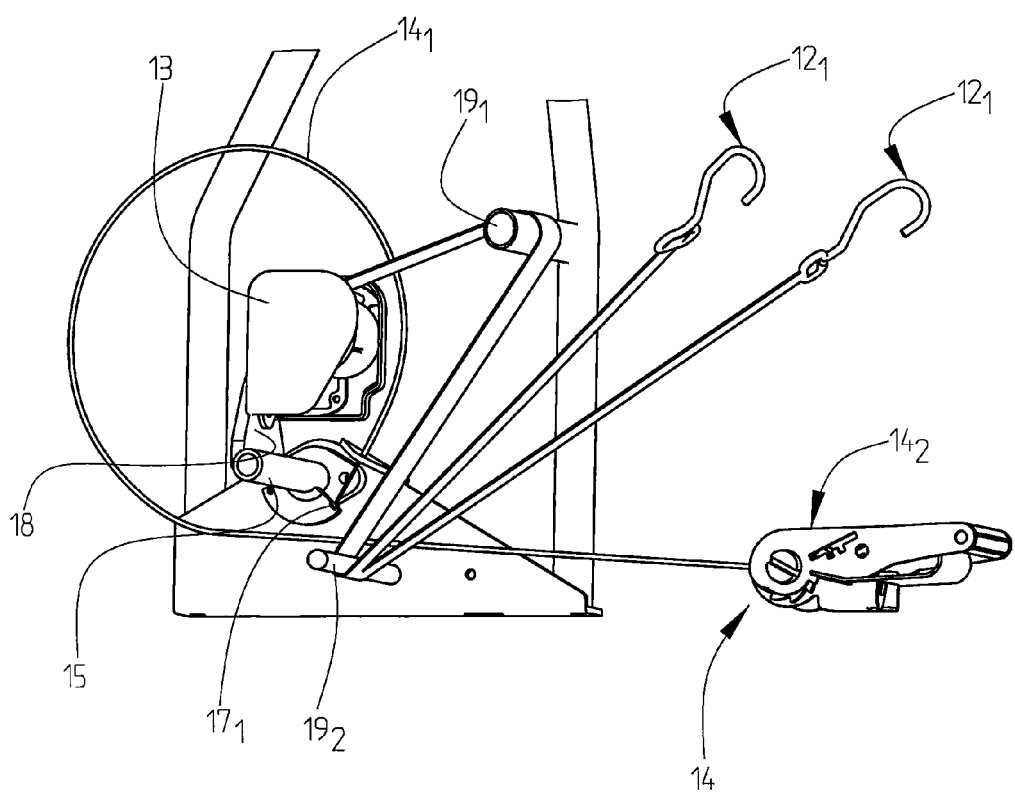
FIG. 11 shows in a simplified way a connection and fastening device for allowing fastening of a wheelchair or the like to the seating arrangement in the second functional state.

FIG. 11 shows in more detail the arrangement of the connection and fastening device 11, particularly how the retaining strap, or the wire casing 14$_2$, the wire 14$_1$ are through hole in sheet-metal projection 16 fixedly connected with the centre hub of the shaft 15 at a point 17$_1$. The connection point is displaced a distance outward in relation to the shaft and activation of the retaining strap by tightening or pumping results, in the example shown, in the shaft rotating counter-clockwise, which results in the sheet-metal plate or panel 18 on which the inertia-reel seat belt housing or the reeling mechanism 13 is fixedly mounted being tilted rearward, which results in the inertia-reel seat belt being arrested or locked. Additional pumping with the retaining strap makes the shaft to rotate further, which in turn results in the wheelchair or the like being pulled even harder against the seating arrangement so that it becomes fastened thereto.

The connection and fastening device may of course be formed in various ways, the essential being that tightening by, for instance, a retaining strap or the like results in an inertia-reel seat belt mechanism being locked so that it in the locked state can be utilized to pull a wheelchair or the like to a certain position. In a first free state, the inertia-reel seat belt may be utilized to allow extension of the belt by the hooks (e.g.) so that they can be attached in the wheelchair even if it is placed a (small) distance from the seating arrangement, i.e., the inertia-reel seat belt device is utilized in two different states, in two different ways and contributes to bring the wheelchair or the like to parking position.

According to the present invention, the inertia-reel seat belt device may be formed in various ways. For instance, common retaining straps may be used; it is also possible to utilize retaining straps having tighteners or retaining-strap handles, etc. Advantageously, a special retaining strap or a retaining-strap device formed according to the present invention is used. In the same, disengagement of the retaining strap is effected by the handle returning to the starting position when it is collapsed. As soon as pumping of the handle is commenced, a catch is tripped, which prevents the handle from being collapsed. In order to collapse the handle, and decouple it, disconnect, a spring-loaded catch 35 is pulled rearward. The retaining-strap handle according to the invention is described in more detail in FIGS. 12A, 12B, 12C.

Figure 12A:
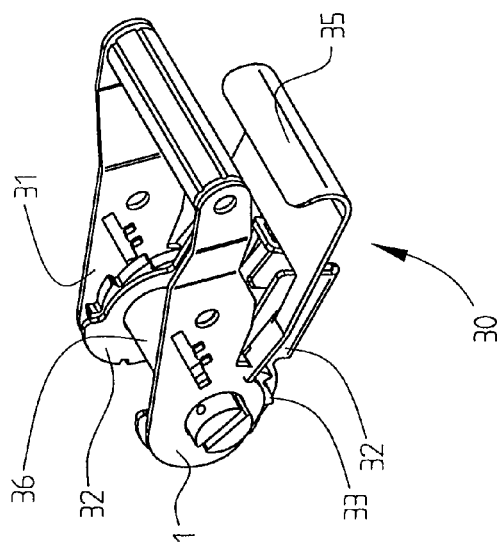
FIG. 12A shows an example of a retaining-strap handle that can be used in the connection and fastening device as seen in perspective from above.
Figure 12B:
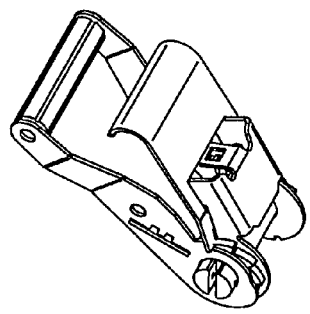
FIG. 12B shows the retaining-strap handle according to FIG. 12A as seen obliquely from below.
Figure 12C:
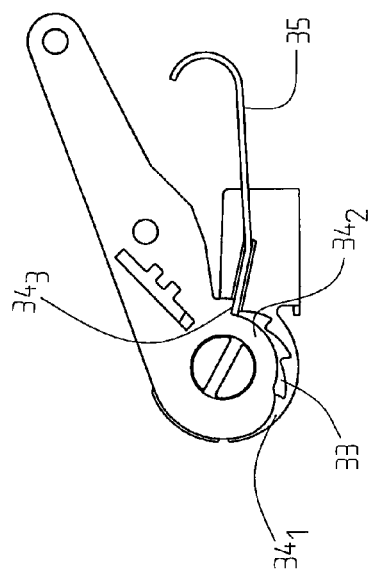
FIG. 12C shows the retaining-strap handle according to FIGS. 12A, 12B as seen from the side.

FIG. 12A shows a retaining strap 30 having a retaining-strap handle formed in principle in a usual way in that a thong or a wire is fixed to a shaft 36. Inner and outer handle parts 31, 32 are mounted around said shaft 36 on both sides of saw-tooth cogs 33. Said outer 31 as well as said inner 32 handle parts are provided with respective spring-loaded members that engage between the saw-tooth like teeth so that upon pumping by the handle, the wire or the belt is pulled in and wound around the shaft 36. A first, present cam 34$_1$ on the outer handle part is reached after that a spring-loaded catch present in the handle has been disengaged, which sometimes may be difficult and complicated. Therefore, the outer handle part 32 according to the present invention is provided with one or more cams 34$_2$ that, for instance, also comprise a lug 34$_3$ or the like, 34$_3$. The retaining-strap handle according to the present invention is also provided with a grip device 35, activation of which results in it becoming possible to reach the extra cam 34₂ and the lug 34₃, respectively. Accordingly, the same can be reached without it being necessary to disengage the conventional catch in the handle, which means an essential simplification. Accordingly, the handle according to the invention can be used disengaged in two different ways, either in a conventional way by disengaging a spring-loaded catch in the handle or also by the fact that in the collapsed state, see FIG. 12B, by the special design with an extra cam and lug or the like, respectively, the same can be reached, for instance, by actuating the grip device 35, for instance pulling it outward in the direction of the arrow, FIG. 12C, or rotating it, which is extremely advantageous, especially if you only have one hand available or do not have sufficient power to disengage a conventional catch.

It is obvious that retaining straps or retaining-strap handles as described herein may be used in other applications, generally everywhere where retaining straps are used. It is not limited to be utilized in the seating arrangement according to the invention, but may be used to fasten all forms of cargo. In the same way, the present invention is not limited to utilize exactly this retaining strap or retaining-strap handle.

The invention may be varied in a number of ways within the scope of the appended claims. An advantage of the invention is that it becomes easy, e.g., for a wheelchair-bound person, to reconfigure a seating according to the invention into a wheelchair place with protection for the back as well as the neck. An essential advantage is also that it becomes possible to manage to fasten and disengage the wheelchair by oneself without requiring help from others, and it may even be possible to manage the entire procedure by one hand. The proper reconfiguration from a seating with backrest into a fastening place with back- and headrest for a wheelchair can be effected by a single hand grip. By pushing the seat part upward, also space is made available in a better way than till now for a wheelchair or the like and then easy access to the hooks and the device for fastening of the wheelchair is facilitated. Preferably, a catch engages automatically, e.g., spring-loaded, when the seat arrangement is reconfigured into the second functional state. For the reconfiguration into the first functional state, a catch may, for instance, be disengaged by pressing in a handle or the like. Hence, the invention is advantageous both what regards simplicity and access for persons that travel with wheelchair in any form of vehicle, and in that it increases the safety for the person who travel, and in addition the seating arrangement is formed in such a way that it does not become particularly space-demanding in the second functional state thereof.

The invention claimed is:

1. A reconfigurable seating arrangement for a means of conveyance, comprising:
a first frame section element connected with a backrest part having an upper end and a lower end;
a second frame section element connected with a seat part having an upper side and a lower side;
a connection and reconfiguration device arranged to connect the first frame section element and the second frame section element such that the reconfigurable seating arrangement can be reconfigured between a first state, in which the first and second frame section elements are arranged in relation to each other such that the upper side of the seat part and the backrest part form a seat having a backrest, and a second state, in which the first and second frame section elements are arranged in relation to each other such that the lower side of the seat part forms a substantially vertical support for a rear side of a wheelchair adjacent to the reconfigurable seating arrangement;
wherein the connection and reconfiguration device comprises:
a plurality of connection members, each having a first end connected, via a respective first connection, with the lower end of the backrest part and a second end connected, via a respective second connection, with the second frame section element;
a spring device configured for facilitating reconfiguration between the first and second states; and
control members and lifting members for controlling and lifting or lowering the second frame section element upon reconfiguration between the first and second states by activating the spring device, the second frame section element being rotated, via the connection members, at first and second hinge connections; the control members being configured to control, upon reconfiguration, movement of the seat part in a vertical direction; wherein in the second state, the upper side of the seat part is substantially parallel to the backrest part; the seat part is displaced upward in relation to its position in the first state a distance that is determined by the control members; and reconfiguration from the first state to the second state can be carried out by a one-handed grip.

2. The reconfigurable seating arrangement of claim 1, wherein the lower side of the seat part has a headrest device, comprising a headrest connected with the second frame section element, the headrest being arranged on tubes so that the headrest can be adjusted in at least a vertical direction in the second state.

3. The reconfigurable seating arrangement of claim 2, wherein the headrest, when in a first, recessed position, is arranged to be positioned at a distance from a front edge of the seat part.

4. The reconfigurable seating arrangement of claim 1, further comprising a first catch member associated with the spring device and configured to arrest a position of the second frame section element or the seat part in relation to the first frame section element or the backrest part in the second state.

5. The reconfigurable seating arrangement of claim 1, wherein the spring device comprises a gas-damping device.

6. The reconfigurable seating arrangement of claim 5, wherein the gas-damping device comprises a gas spring having a piston rod running in a piston cylinder, and upon activation of the gas-damping device, the piston rod is arranged to be pushed out of the piston cylinder.

7. The reconfigurable seating arrangement of claim 6, further comprising a first catch member associated with the spring device and configured to arrest a position of the second frame section element or the seat part in relation to the first frame section element or the backrest part in the second state; wherein the first catch member comprises a sleeve slidably fitted around the gas-damping device; the gas damping device having a given stroke length; the first catch member has substantially the same length as the stroke length of the gas spring and is arranged, when the piston rod of the gas spring is maximally extended, to surround the piston rod and rest against an upper end of the piston cylinder so that the gas spring is blocked with the piston rod in an extended position.

8. The reconfigurable seating arrangement of claim 7, further comprising a catch actuating member arranged, upon activation, to disengage the first catch member, the first catch member having a slot, so that the first state can be assumed.

9. The reconfigurable seating arrangement of claim 1, further comprising a connection and fastening device configured for fastening the wheelchair to the seating arrangement in the second state, wherein the connection and fastening device includes an attachment mechanism for releasable attachment of the wheelchair connected with an inertia-reel seat belt mechanism mounted on a shaft, and an activation mechanism for tilting a reeling mechanism of the inertia-reel seat belt mechanism to block the seat belt, enabling pulling of the wheelchair by the attachment mechanism.

10. The reconfigurable seating arrangement of claim 9, wherein the attachment mechanism includes a plurality of bands having hooks arranged at a height above a surface on which the seating arrangement is arranged, so that the hooks are accessible for a person in the wheelchair.

11. The reconfigurable seating arrangement of claim 1, wherein the first frame section element comprises front and rear support legs that run from an upper part of the first frame section element toward the floor and are spaced-apart from each other at least at their lower ends, and at least one of the front and rear support legs includes a weakened portion so that upon impact, the at least one support leg including the weakened portion folds and the impact is absorbed by the other support legs.

* * * * *